US008886198B2

(12) United States Patent
Tinnakornsrisuphap et al.

(10) Patent No.: US 8,886,198 B2
(45) Date of Patent: Nov. 11, 2014

(54) ACTIVE HANG-IN FOR MULTI-FEMTO DEPLOYMENTS

(75) Inventors: Peerapol Tinnakornsrisuphap, San Diego, CA (US); Yeliz Tokgoz, San Diego, CA (US); Chirag Sureshbhai Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 137 days.

(21) Appl. No.: 13/246,815

(22) Filed: Sep. 27, 2011

(65) Prior Publication Data

US 2012/0258720 A1 Oct. 11, 2012

Related U.S. Application Data

(60) Provisional application No. 61/387,097, filed on Sep. 28, 2010.

(51) Int. Cl.
*H04W 36/00* (2009.01)
*H04W 36/04* (2009.01)
*H04W 36/18* (2009.01)
*H04W 84/04* (2009.01)

(52) U.S. Cl.
CPC ............. *H04W 36/04* (2013.01); *H04W 36/18* (2013.01); *H04W 84/045* (2013.01)
USPC ........................... 455/442; 455/436; 455/444

(58) Field of Classification Search
CPC ..... H04W 36/30; H04W 36/18; H04W 36/12; H04W 36/04; H04W 16/32; H04W 80/04
USPC ........................... 455/436–439; 370/331–332
See application file for complete search history.

(56) References Cited

U.S. PATENT DOCUMENTS

| | | | |
|---|---|---|---|
| 8,311,545 B2 * | 11/2012 | Zhu et al. | 455/444 |
| 8,355,725 B2 * | 1/2013 | Nylander et al. | 455/442 |
| 2006/0286983 A1 | 12/2006 | Otsuka et al. | |
| 2007/0254620 A1 * | 11/2007 | Lindqvist et al. | 455/403 |
| 2008/0102877 A1 | 5/2008 | Suemitsu et al. | |
| 2008/0132239 A1 | 6/2008 | Khetawat et al. | |

(Continued)

FOREIGN PATENT DOCUMENTS

| | | |
|---|---|---|
| WO | WO-2006117838 A1 | 11/2006 |
| WO | WO-2009049032 | 4/2009 |
| WO | WO2010060063 A1 | 5/2010 |

OTHER PUBLICATIONS

International Search Report and Written Opinion—PCT/US2011/053735—ISA/EPO—Dec. 12, 2011.

(Continued)

*Primary Examiner* — Cong Tran

(57) ABSTRACT

A method for enabling an active hand-in from a macro base station network to a femtocell network includes servicing an active hand-in of a mobile entity from a macro base station to a femtocell network, using a first femtocell of the femtocell network. The active hand-in includes a hard handoff of the mobile entity from the macro base station with soft handoff of the mobile entity enabled between the first femtocell and one or more neighboring femtocells in the femtocell network. The hard handoff with soft handoff enabled may be implemented using novel procedures implemented by one or more entities of a wireless communications network including the femtocells and macro base station.

31 Claims, 8 Drawing Sheets

(56) References Cited

U.S. PATENT DOCUMENTS

| | | |
|---|---|---|
| 2009/0042536 A1 | 2/2009 | Bernard et al. |
| 2009/0111499 A1* | 4/2009 | Bosch et al. ............... 455/522 |
| 2009/0233605 A1* | 9/2009 | Kim ........................ 455/436 |
| 2009/0280819 A1 | 11/2009 | Brisebois et al. |
| 2009/0316649 A1* | 12/2009 | Chen ........................ 370/331 |
| 2010/0027521 A1* | 2/2010 | Huber et al. ............... 370/338 |
| 2010/0130210 A1 | 5/2010 | Tokgoz et al. |
| 2010/0189085 A1 | 7/2010 | Kent et al. |
| 2010/0197309 A1 | 8/2010 | Fang et al. |
| 2010/0297997 A1 | 11/2010 | Yavuz et al. |
| 2010/0331000 A1* | 12/2010 | Zhu et al. ................... 455/444 |
| 2011/0019639 A1* | 1/2011 | Karaoguz et al. ............ 370/331 |

OTHER PUBLICATIONS

Joshi, et al., "Performance Analysis of Active Handoff in CDMA2000 Femtocells," 2010 IEEE National conference on Communications (NCC), pp. 1-5, 2010.

* cited by examiner

FIG. 8

800

802 — IDENTIFYING THE ONE OR MORE NEIGHBORING FEMTOCELLS OF THE FEMTOCELL, USING A SELECTION PROCEDURE AT THE FIRST FEMTOCELL BASED ON SIGNALS FROM FEMTOCELLS OF THE FEMTOCELL NETWORK

804 — IDENTIFYING THE ONE OR MORE NEIGHBORING FEMTOCELLS OF THE FIRST FEMTOCELL, USING A DEFINED SET OF NEIGHBORS PROVIDED BY A SEPARATE ENTITY.

900

902 — SYNCHRONIZING A BEACON HOPPING PATTERN AMONG FEMTOCELLS OF THE FEMTOCELL NETWORK USING A COMMON TIME REFERENCE, WHEREBY THE FEMTOCELLS TRANSMIT FREQUENCY HOPPING BEACONS ON COMMON FORWARD LINK FREQUENCIES AT SYNCHRONIZED TIMES

904 — SELECTING THE FIRST FEMTOCELL BASED ON MEASUREMENTS OF THE FREQUENCY HOPPING BEACONS MADE BY THE MOBILE ENTITY.

FIG. 9

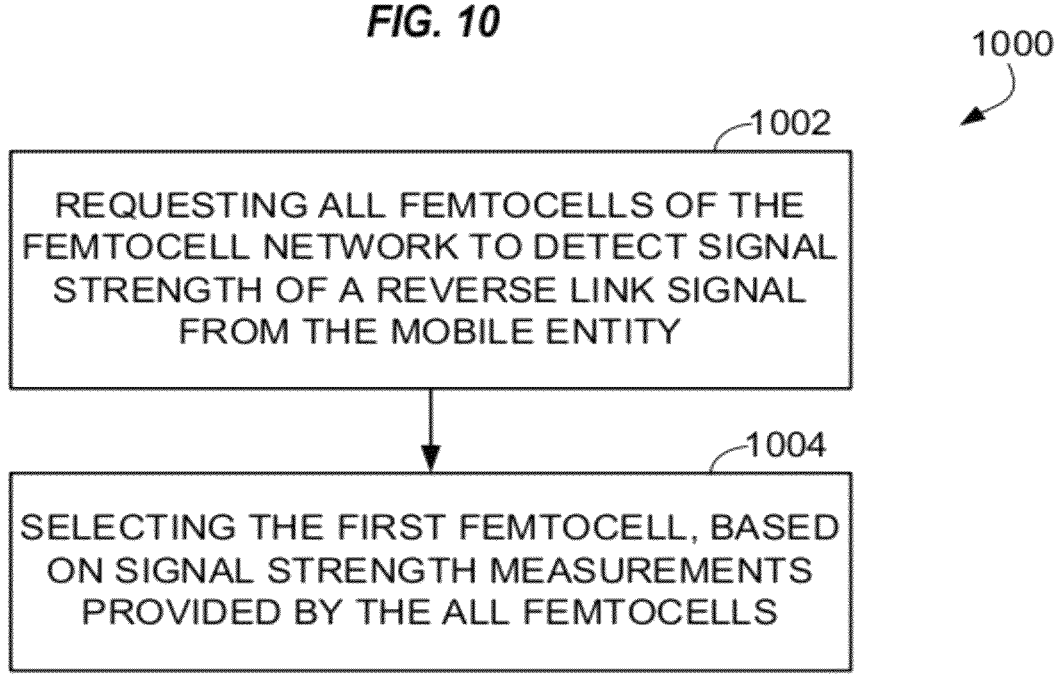

ACTIVE HANG-IN FOR MULTI-FEMTO DEPLOYMENTS

CROSS-REFERENCE TO RELATED APPLICATION

This application claims priority pursuant to 35 U.S.C. §119 (e) to U.S. provisional application Ser. No. 61/387,097, filed Sep. 28, 2010, which is hereby incorporated by reference in its entirety.

FIELD

Aspects of the present disclosure relate generally to wireless communication systems, and more particularly, to active hand-in from a cellular base station to a network of femtocells.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

To supplement conventional mobile phone network base stations, additional base stations may be deployed to provide more robust wireless coverage to mobile units. For example, wireless relay stations and small-coverage base stations (e.g., commonly referred to as access point base stations, Home NodeBs, femto access points, or femto cells) may be deployed for incremental capacity growth, richer user experience, and in-building coverage. Typically, such small-coverage base stations are connected to the Internet and the mobile operator's network via DSL router or cable modem. As these other types of base stations may be added to the conventional mobile phone network (e.g., the backhaul) in a different manner than conventional base stations (e.g., macro base stations), there is a need for effective techniques for managing these other types of base stations and their associated user equipment, including managing of hand-in from a macro-cell network.

SUMMARY

Active hand-in refers to handoff of a voice or data session of a mobile station from macrocell base station to a femtocell base station when the mobile station moves into a coverage area served by the femtocell base station. Active hand-in may be required to maintain voice call quality and continuity or data service when users move into a femtocell coverage area. Additionally, active hand-in may be used to offload traffic from macro network and thereby free up resources for other users. However, active hand-in is quite challenging, and existing solutions for hand-in have some drawbacks. Active hand-in may be especially challenging in commercial multi-femtocell deployments (also known as enterprise femtocell deployments), such as used, for example, in corporate offices, airports, shopping malls, or the like. The close proximity of several femtocells in such deployments and other factors may make identification of an optimal target femtocell for hand-in difficult. The present disclosure provides methods and apparatus for active hand-in of an access terminal to a femtocell base station in a network of multiple femtocell base stations, such as in multi-femto deployments.

In an aspect, a femtocell (HNB, etc.) may perform a method for enabling an active hand-in from a macro base-station network to a femtocell network, in cooperation with other network entities. The method may include servicing an active hand-in of a mobile entity from a macro base station to a femtocell network, using a first femtocell of the femtocell network. The first femtocell may be identified as an optimal target cell by a network entity. The method may further include enabling soft handoff of the mobile entity between the first femtocell and one or more neighboring femtocells in the femtocell network with a hard handoff of the mobile entity from the macro base station for the active hand-in. In an aspect of the method, the soft handoff may be enabled prior to, simultaneously with, or immediately upon completion of the hard handoff, such that soft handoff service is enabled for the mobile entity from the first data bit served after hand-in.

In a related aspect, the method may include receiving, at the first femtocell, a request from a network entity to assign traffic channel resources for the mobile entity to initiate a hard handoff to the first femtocell. The method may include the first femtocell requesting assignment of traffic channel resources from the one or more neighboring femtocells, in response to the request. The method may further include the first femtocell signaling first identifiers including a separate identifier for each of the first femtocell and the one or more neighboring femtocells, and second identifiers including a separate identifier for each of the traffic channel resources of the first femtocell and the traffic channel resources requested from the one or more neighboring femtocells, in reply to the request. The method may include preparing the one or more neighboring femtocells for the active hand-in of the mobile entity, based on receiving the request, such as by allocating the traffic channel resources as requested.

In another aspect, the method may include the first femtocell, or another network entity, identifying the one or more neighboring femtocells of the femtocell, using a selection procedure at the first femtocell based on signals from femtocells of the femtocell network. In the alternative, or in addition, the method may include identifying the one or more neighboring femtocells of the first femtocell, using a defined set of neighbors provided by a separate entity.

In an independent aspect related to identifying and selecting the first target femtocell, the method (or an independent method) may include synchronizing a beacon hopping pattern among femtocells of the femtocell network using a common time reference, whereby the femtocells transmit frequency hopping beacons on common forward link frequencies at synchronized times. This may further include a network entity selecting the first femtocell based on measurements of the frequency hopping beacons made by the mobile entity.

In another independent aspect related to identifying and selecting the first femtocell, the method (or an independent method) may include a network entity requesting all femtocells of the femtocell network to detect signal strength of a reverse link signal from the mobile entity. Such method may further include the network entity receiving measurements of the signal strength of the reverse link signal from respective ones of the femtocells. The network entity may select the first femtocell, based on the measurements.

In related aspects, a wireless communications apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as femtocell, macro base stations or mobile entities of various types used for wireless communications. Similarly, an article of manufacture may be provided, including a non-transitory computer-readable storage medium holding encoded instructions, which when executed by a processor, cause a wireless communications apparatus to perform the methods and aspects of the methods as summarized above.

BRIEF DESCRIPTION OF THE DRAWINGS

The features, nature, and advantages of the present disclosure will become more apparent from the detailed description set forth below when taken in conjunction with the drawings described below. Throughout the drawings and detailed description, like reference characters may be used to identify like elements appearing in one or more of the drawings.

FIGS. 6-10 are flow diagrams illustrating methodologies for active hand-in to a multi-femto deployment or related operations.

DETAILED DESCRIPTION

Figure 1:
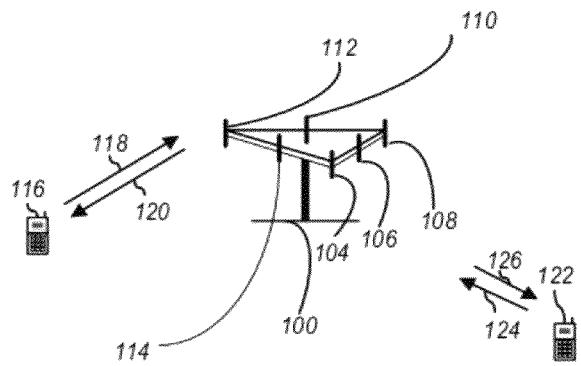
FIG. 1 illustrates a multiple access wireless communication system.

The detailed description set forth below, in connection with the appended drawings, is intended as a description of various configurations, and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as, for example, Universal Terrestrial Radio Access (UTRA) or CDMA 2000. UTRA includes Wideband CDMA (WCDMA) and other variants of CDMA. CDMA 2000 may be described by IS-2000, IS-95 and IS-856 standards. A TDMA network may implement a radio technology such as, for example, Global System for Mobile Communications (GSM). An OFDMA network may implement a radio technology such as, for example, Evolved UTRA (E-UTRA), Ultra Mobile Broadband (UMB), IEEE 802.11 (Wi-Fi), IEEE 802.16 (WiMAX), IEEE 802.20, and Flash-OFDMA. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA 2000 and UMB are described in documents from an organization named "3rd Generation Partnership Project 2" (3GPP2). The techniques described herein may be used for the wireless networks and radio technologies mentioned above as well as other wireless networks and radio technologies. By way of example only, certain aspects of the techniques are described below for CDMA 2000 1xRTT, and related terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Aspects of the present disclosure may be adapted for use in a network that includes macro scale coverage (e.g., a large area cellular network such as a 3G networks, typically referred to as a macro cell network) and smaller scale coverage (e.g., a residence-based or building-based network environment). As an access terminal ("AT") moves through such a network, the access terminal may be served in certain locations by access nodes ("ANs") that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors. In 3GPP, the term "cell" can refer to a coverage area of an eNB and/or an eNB subsystem serving this coverage area, depending on the context in which the term is used.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femto cell, femto access point, and so on.

Referring to FIG. 1, a multiple access wireless communication system according to one embodiment is illustrated. An access point 100 (AP) may include multiple antenna groups, for example one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a Frequency Division Duplex (FDD) system, communication links 118, 120, 124 and 126 may use different frequencies for communication. For example, forward link 120 may use a different frequency then that used by reverse link 118.

Each group of antennas and/or the area in which they are designed to communicate is often referred to as a sector of the access point. In the illustrated system, antenna groups each are designed to communicate to access terminals in a sector, of the areas covered by access point 100.

In communication over forward links 120 and 126, the transmitting antennas of access point 100 may utilize beam forming in order to improve the signal-to-noise ratio of forward links for the different access terminals 116 and 122. An access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, an evolved Node B (eNB), macro cell, macro cell base station or some other terminology. An access terminal may also be called an access terminal, user equipment (UE), a wireless communication device, terminal, access terminal or some other terminology.

Figure 2:
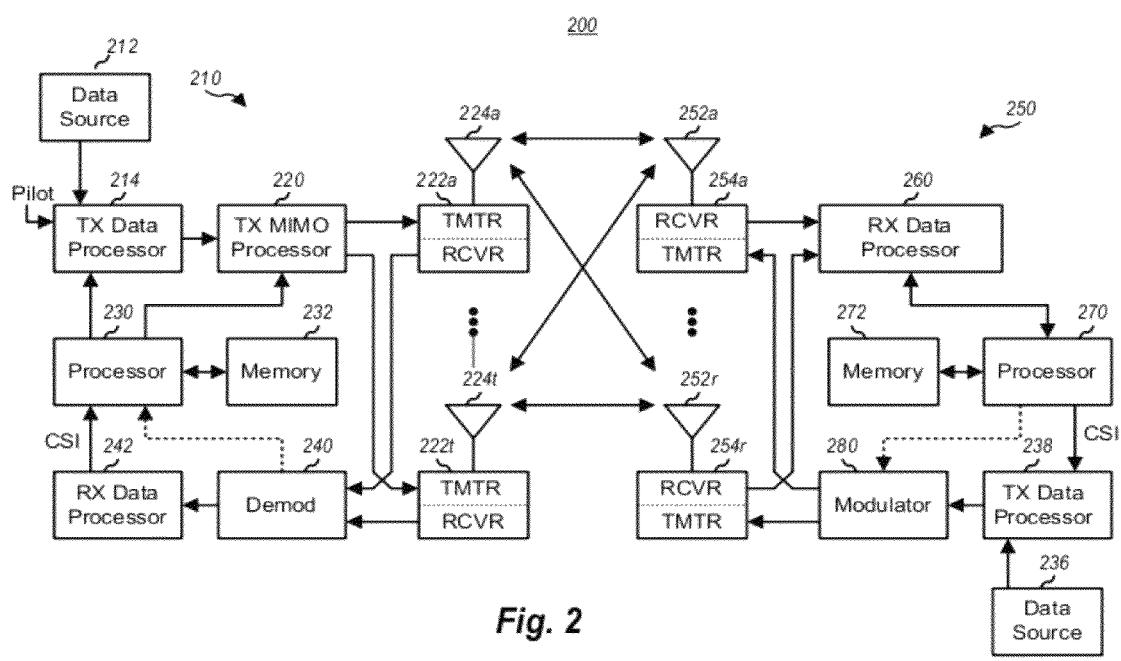
FIG. 2 illustrates a block diagram of a transmitter/receiver system illustrating related aspects of a wireless access point and access terminal.

FIG. 2 is a block diagram showing aspects of a transmitter system 210 and a receiver system 250 in a Multiple-Input Multiple-Output (MIMO) system 200. Aspects of the transmitter system may be adapted for an access point, for example a femtocell base station, for performing an active hand-in procedure as described herein. Aspects of the receiver system may be adapted for an access terminal, for example a mobile station or user equipment, in communication with the access terminal. The transmitter system 210 and receiver systems 250 exemplify a suitable transmitter-receiver system in which other, more detailed aspects of the present disclosure may be practiced. It should be apparent that these more detailed aspects may also be practiced using other transmitters, receivers, or transmitter-receiver systems, and is not limited to the particular architecture illustrated in FIG. 2. It should be further apparent that a transmitter system that incorporates inventive aspects of the present disclosure will generally include other components or aspects as described elsewhere herein.

At the transmitter system 210, traffic data for a number of data streams is provided from a data source 212 to a transmit (TX) data processor 214. In some transmitter systems, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream may then be modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams may then be provided to a TX MIMO processor 220, which may further process the modulation symbols (e.g., for OFDM). TX MIMO processor 220 then provides NT modulation symbol streams to NT transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals may be received by NR antennas 252a through 252r. The received signal from each antenna 252 may be provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 may then receive and process the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 may process received data and generate appropriate response signals according to a control methodology, using data and instructions in the operatively coupled memory 272. The methodology may include cooperating with a femtocell transmitting system to complete an active hand-in to a femtocell network, as described in more detail elsewhere herein. In a related aspect, the processor 270 may formulate a reverse link message comprising a matrix index portion and a rank value portion as required to accomplish this cooperation with the femtocell.

The reverse link message may comprise various types of information regarding the communication link and/or the received data stream. The reverse link message may then be processed by a TX data processor 238, which may also receive traffic data for a number of data streams from a data source 236 to provide uplink signals. The uplink signals may be modulated by a modulator 280, conditioned by transmitters 254a through 254r, and transmitted back to transmitter system 210.

At transmitter system 210, the modulated uplink signals from receiver system 250 may be received by antennas 224, conditioned by receivers 222, demodulated by a demodulator 240, and processed by a RX data processor 242 to extract a reverse link message transmitted by the receiver system 250. Processor 230 may then determine which pre-coding matrix to use for determining the beamforming weights then processes the extracted message, using data and instructions stored in a memory 232 operable associated with the processor 230. The processor 230 may also generate messages for transmitting to the receiver system 250, to a macro base station, or to other femto base stations, and initiate other actions to execute an active hand-in of an access terminal to a femtocell network with soft hand over enabled, as described in more detail elsewhere herein. Instructions and data for performing these operations may be stored in the memory 232, and loaded into the processor 230 for execution at appropriate times.

In an aspect, logical channels used for exchanging information between a transmitter and receiver may be classified into Control Channels and Traffic Channels. Logical Control Channels comprises Broadcast Control Channel (BCCH) which may be a downlink (DL) channel for broadcasting system control information. A Paging Control Channel (PCCH) may be a DL channel that transfers paging information. A Multicast Control Channel (MCCH) may be a point-to-multipoint DL channel used for transmitting Multimedia Broadcast and Multicast Service (MBMS) scheduling and control information for one or several Multicast Traffic Channels (MTCHs). Generally, after establishing an RRC connection this channel may be used by access terminals capable of receiving and using MBMS signals. A Dedicated Control Channel (DCCH) may be a point-to-point bi-directional channel that transmits dedicated control information for use by access terminals having an RRC connection. In aspect, Logical Traffic Channels may further include a Dedicated Traffic Channel (DTCH), which may be a point-to-point bi-directional channel, dedicated to one UE, for the transfer of user information. Also, an MTCH may be a Point-to-multipoint DL channel for transmitting traffic data.

In an aspect, Transport Channels may be classified into DL and uplink (UL.) DL Transport Channels may include a Broadcast Channel (BCH), Downlink Shared Data Channel (DL-SDCH) and a Paging Channel (PCH). UL Transport Channels may include a Random Access Channel (RACH), a Request Channel (REQCH), a Uplink Shared Data Channel (UL-SDCH) and plurality of physical (PHY) channels. The PHY channels may include a set of DL channels and UL channels. The foregoing channels are merely examples of channels used in modern wireless communication systems, and are not meant to represent and exclusive or exhaustive list of channels. These and other channels may be used to implement more detailed aspects of the present disclosure.

Figure 3:
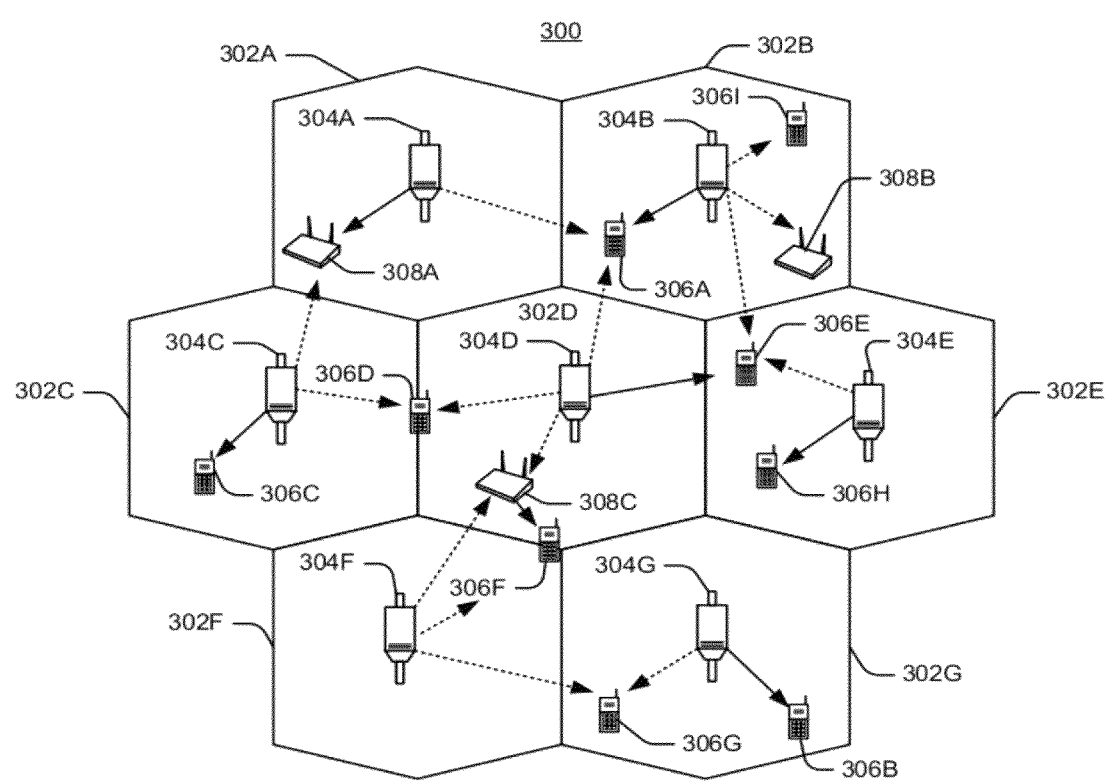
FIG. 3 illustrates aspects of a multi-cell wireless communication system that may use active hand-in procedures for hand-in of an access terminal to a network of femtocells.

FIG. 3 illustrates a wireless communication system 300, configured to support a number of users, in which the teachings herein may be implemented. The system 300 provides communication for multiple cells 302, such as, for example, macro cells 302A-302G, with each cell being serviced by a corresponding access point 304 (e.g., access points 304A-304G). A network controller (not shown) may couple to a set of base stations (e.g., group 304A-304G) and provide coordination and control for these access points. The network controller may communicate with the access points via a backhaul. The access points in group 304A-304G may also communicate with one another, e.g., directly or indirectly via wireless or wireline backhaul. Each access point in the group 304A-304G may be connected to other access points in the group via a first broadband backhaul network (not shown).

The system may include additional, lower power access points 308A-308C, for example, femto base stations. Accordingly, the system 300 may be considered a heterogeneous network that includes access points of different types, e.g., macro eNBs, pico eNBs, femto eNBs, relays, etc. These different types of access points may have different transmit power levels, different coverage areas, and different impact on interference in the wireless network 300. For example, macro eNBs may have a high transmit power level (e.g., 5 to 40 Watts) whereas picocell base stations, femtocell base stations and relays may have a lower transmit power level (e.g., 0.1 to 2 Watt).

The access points 304A-304G may be dispersed throughout the wireless network system 300, and each access terminal may be stationary or mobile. An access terminal may also be referred to as a UE, a terminal, a mobile station, a mobile entity, a subscriber unit, a station, or other terminology. A UE may be a cellular phone, a personal digital assistant (PDA), a wireless modem, a wireless communication device, a handheld device, a laptop computer, a cordless phone, a wireless local loop (WLL) station, or other mobile entities. A UE may be able to communicate with macro eNBs, pico eNBs, femto eNBs, relays, or other network entities. In FIG. 3, a solid arrow line indicates desired transmissions between an access terminal and a serving base station, which is a base station designated to serve the access terminal on the downlink and/or uplink. A dashed arrow line indicates interfering transmissions between a base station and a terminal.

Each lower power access point in the group 308A-308C may be connected to other access points in its group via a second broadband backhaul network (not shown). However, no backhaul connection may exist between the access points in the group 304A-304G and the group 308A-308C, and therefore access points in these different groups may not be capable of communicating directly with access points in a different group. Voice and traffic frames therefore cannot be sent simultaneously to both groups 304A-304G and 308A-308C, which prevents soft hand-off between entities in these different groups. Therefore, when handing over an access terminal from an access point in the group 304A-304G to an access point in the group 308A-308C, it may be necessary to perform an active hand-in procedure including a hard hand-off As shown in FIG. 3, access terminals 306 (e.g., access terminals 306A-306I) may be dispersed at various locations throughout the system, which locations may change over time. Each access terminal 306 may communicate with one or more access points 304 on a forward link ("FL") and/or a reverse link ("RL") at a given moment, depending upon whether the access terminal 306 is active and whether it is in soft handoff, for example. Different protocols may be used on the RL and FL. The wireless communication system 300 may provide wireless service over a large geographic region. For example, access points 302A-302G may be configured as macro cells covering a few blocks in a neighborhood, or larger areas. Lower-power access points such as access points 308A-308C may provide wireless service over a relatively small area, for example a portion of an office building, airport, office complex, or other service area that may be contained in one or more of the cells 302A-302G.

The wireless system 300 may support synchronous or asynchronous operation. For synchronous operation, the access points may have similar frame timing, and transmissions from different access points may be approximately aligned in time. For asynchronous operation, the access points may have different frame timing, and transmissions from different access points may not be aligned in time. The techniques described herein may be used for both synchronous and asynchronous operation.

Figure 4:
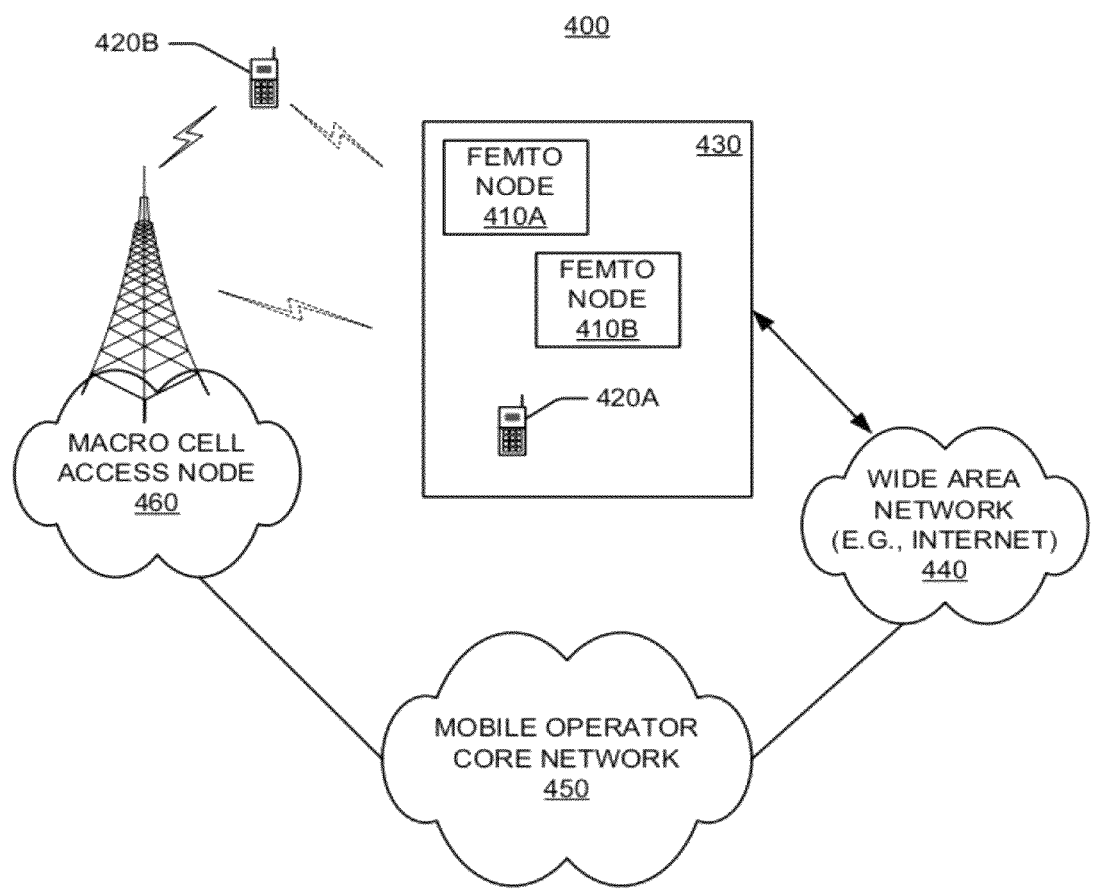
FIG. 4 illustrates other aspects of the wireless communication system including deployment of femto nodes within a network environment.

FIG. 4 illustrates an exemplary communication system 400 where one or more femto nodes are deployed within a network environment. Specifically, the system 400 may include multiple femto nodes 410A-410B installed in a relatively small scale network environment., for example, in one or more offices 430. Each femto node 410A-410B may be coupled to a wide area network 440 (e.g., the Internet) and a mobile operator core network 450 via a DSL router, a cable modem, a wireless link, or other connectivity means (not shown). As will be discussed below, each femto node 410A-410B may be configured to serve associated access terminals (e.g., access terminal 420A) and, optionally, alien access terminals (e.g., access terminal 420B). Access to femto nodes 410A-410B may be restricted to a subset of mobile subscribers if desired, whereby a given access terminal 420 may be served by a set of one or more designated (e.g., home) femto nodes 410A-410B but may not be served by any non-designated femto nodes such as a neighbor's femto node.

Figure 5:
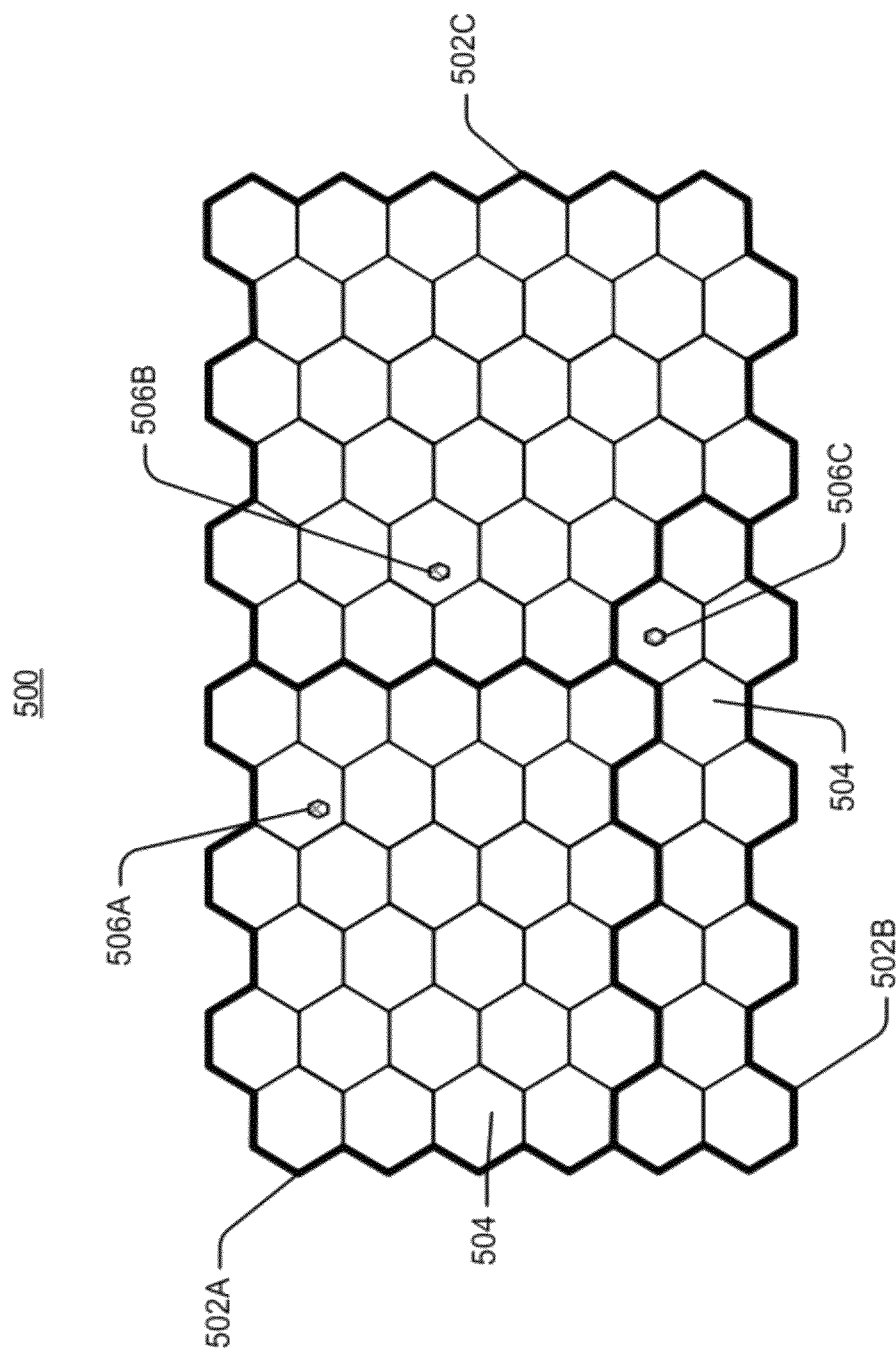
FIG. 5 illustrates an example of a coverage map where several tracking areas are defined.

FIG. 5 illustrates an example of a coverage map 500 where several tracking areas 502A-502C (or routing areas or location areas) are defined, each of which includes several macro coverage areas 504 (two of many indicated). Here, areas of coverage associated with tracking areas 502A, 502B, and 502C are delineated by the wide lines and the macro coverage areas 504 are represented by the hexagons. The tracking areas 502 also include femto coverage areas 506. In this example, each of the femto coverage areas 506A-506C (e.g., femto coverage area 506C) is depicted within a macro coverage area 504. It should be appreciated, however, that a femto coverage area may extend beyond a single macro coverage area 504 to be included in two or more of such macro coverage areas. In practice, a large number of femto coverage areas may be defined with a given tracking area 502A-502C or macro coverage area 504. Also, one or more pico coverage areas (not shown) may be defined within a given tracking area 502A-502C or macro coverage area 504.

Referring again to FIG. 4, the owner of a femto node 410A may subscribe to mobile service, such as, for example, 3G mobile service, offered through the mobile operator core network 450. In addition, an access terminal 420 may be capable of operating both in macro environments and in smaller scale (e.g., residential or office) network environments. In other words, depending on the current location of the access terminal 420, the access terminal 420 may be served by an access node 460 of the macro cell mobile network 450 or by any one of a set of femto nodes, such as the femto nodes 410A and 410B that reside within a corresponding femto service area 430. For example, when a subscriber is outside his home, he is served by a standard macro access node (e.g., node 460) and when the subscriber is at home, he is served by a femto node (e.g., node 410A or 410B). Here, it should be appreciated that a femto node 410A or 410B may be backward compatible with existing access terminals 420.

A femto node 410A, 410B may be deployed on a single frequency or, in the alternative, on multiple frequencies. Depending on the particular configuration, the single frequency or one or more of the multiple frequencies may overlap with one or more frequencies used by a macro node (e.g., node 460). In some aspects, an access terminal 420A or 420B may be configured to connect to a preferred femto node (e.g., the home femto node of the access terminal 420A) whenever such connectivity is possible. For example, whenever the access terminal 420A is within the femto service area 430, it may be desired that the access terminal 420 communicate only with one or more of the femto nodes 410A or 410B.

In some aspects, if the access terminal 420A or 420B operates within the macro cellular network 450 but is not residing on its most preferred network (e.g., as defined in a preferred roaming list), the access terminal 420A or 420B may continue to search for the most preferred network (e.g., the preferred femto node 410A or 410B) using a Better System Reselection ("BSR"), which may involve a periodic scanning of available systems to determine whether better systems are currently available, and subsequent efforts to associate with such preferred systems. With the acquisition entry, the access terminal 420A or 420B may limit the search for specific band and channel. For example, the search for the most preferred system may be repeated periodically. Upon discovery of a preferred femto node 410A, the access terminal 420A may select the femto node 410A for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes, for example by the femto nodes 410A-410B that reside within the corresponding user residence 430. In some implementations, a node may be restricted to not provide, for at least one node, at least one of: signaling, data access, registration, paging, or service. In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access nodes (e.g., femto nodes) that share a common access control list of access terminals. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

For convenience, the disclosure herein describes various functionality in the context of a femtocell base station, also referred to as a femto node or similar terminology. It should be appreciated, however, that a pico node may provide the same or similar functionality for a larger coverage area. For example, a pico node may be restricted, a home pico node may be defined for a given access terminal, and so on.

Problems with Active Hand-In to Multi-Femto Deployments

Active hand-in refers to handoff of a voice or data session of a mobile station from macrocell base station to a femtocell base station when the mobile station moves into a coverage area served by the femtocell base station. Active hand-in may be required to maintain voice call quality and continuity or data service when users move into a femtocell coverage area. Additionally, active hand-in may be used to offload traffic from macro network and thereby free up resources for other users. However, active hand-in is quite challenging, and existing solutions for hand-in have some drawbacks. Active hand-in may be especially challenging in commercial multi-femtocell deployments (also known as enterprise femtocell deployments), such as used, for example, in corporate offices, airports, shopping malls, or the like. The close proximity of several femtocells in such deployments and other factors may make identification of an optimal target femtocell for hand-in difficult.

For active hand-in, the macro network should be able to identify the target base station (BS) where voice or data session must be transferred. In some existing macro networks, the target BS for handoff between two macrocell base stations may be identified based on the FL signal quality report sent by the mobile station (MS), for example, based on a pilot strength measurement message (PSMM) such as done in CDMA2000 1xRTT technology. The PSMM may identify the FL signal quality of neighboring base stations and a unique signature, for example, a pilot code or Psuedo-Noise (PN) Offset, associated with each of the neighbor base stations. A FL signal quality report may be used by the macro network to pick the best neighbor BS as the optimal handoff target.

However, unique identification of an optimal target for active hand-in from a macro BS to a femto BS may present a problem in multi-femtocell deployments. Typically, when macro and femto base stations are on the same frequency, only few PN offset codes (e.g. 5 or thereabouts) may be available, due to lack of unused PN offset codes or other practical limitations. These relatively few PN offset codes may be shared among hundreds of femto BSs within the coverage area of a macro BS. Even when femto base stations are not on the same frequency as macro base stations, femto base stations may radiate beacons including pilot and overhead channels to attract mobile stations to the femto base stations. However, the number of unique PN offsets available for beacon pilot transmissions may be relatively limited, and fewer than needed to uniquely identify a femto base station in a given area. Thus, heavy PN offset code re-use in multi-femtocell deployments may make it difficult or impossible for a macro network entity to correctly identify an optimal target femto base station for active hand-in, because the identifier for the optimal target may be shared by one or more suboptimal target femto base stations in a multi-femto deployment. This problem may be especially apparent for legacy mobiles and femtocells, which may have a more limited capability to use a large number of different PN offsets or other identifiers.

In view of this problem, 3GPP2 has standardized an active hand-in target identification procedure based on reverse link (RL) sensing by femtocells, sometimes referred to as "mobile sensing," for use with active hand-in by legacy mobiles using CDMA2000 1xRTT technology. In this method, when the macro BS receives a PSMM (or equivalent message) with a certain femtocell (or beacon) PN offset code, all femtocells sharing this PN are requested by a network entity such as Femto Convergence Server (FCS) to measure pilot energy of this mobile on the RL frequency. Based on RL pilot signal strength and other metrics, the FCS picks a target femtocell that reports the highest RL pilot strength. In principle, this method may be applicable to other technologies (e.g. WCDMA, WiMax, LTE, etc.) as well.

However, the standard RL sensing method may be subject to performance issues when used for hand-in to multi-femtocell deployments. In multi-femto deployments, several femtocells are likely to be deployed on the same floor or multiple floors of a building, or otherwise spaced relatively close to one another. Therefore, the likelihood of several femtocells measuring similar RL pilot strength may be high, which therefore increases the likelihood that a macro network entity performing the standard procedure will select a sub-optimal target femtocell. For example, a suboptimal target femtocell that is not the most optimal target for a particular hand-in but happens to be placed near a window or other opening may receive a stronger RL pilot compared to the most optimal target that is located in the interior of the building. Channel fading, RF propagation environment variations, inaccuracies in RL energy measurement, and other factors affecting RL measurement values may further exacerbate the problem. Therefore, RL sensing alone may not reliably resolve the problem of identifying an optimal target or otherwise obtaining satisfactory active hand-in performance for active hand-in to multi-femtocell deployments. Thus, it would be advantageous to provide several techniques to improve active hand-in performance in addition to or instead of RL sensing.

To overcome these and other problems associated with active hand-in to multi-femto deployments, and similar active hand-in problems, new methodologies and apparatus as described below may be adapted for use with existing and future wireless communications protocols. Such methodologies and apparatus should provide technical effects including, but not necessarily limited to, reducing or eliminating problems such as summarized above.

Example Methodologies and Apparatus

In view of exemplary systems shown and described herein, methodologies that may be implemented in accordance with the disclosed subject matter, will be better appreciated with reference to various flow charts. For purposes of simplicity of explanation, methodologies are shown and described as a series of acts/blocks, but the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture to facilitate transporting and transferring such methodologies to various devices. Those skilled in the art will understand and appreciate that a method could alternatively be represented as a series of interrelated states or events, such as in a state diagram.

Figures 6, 7:
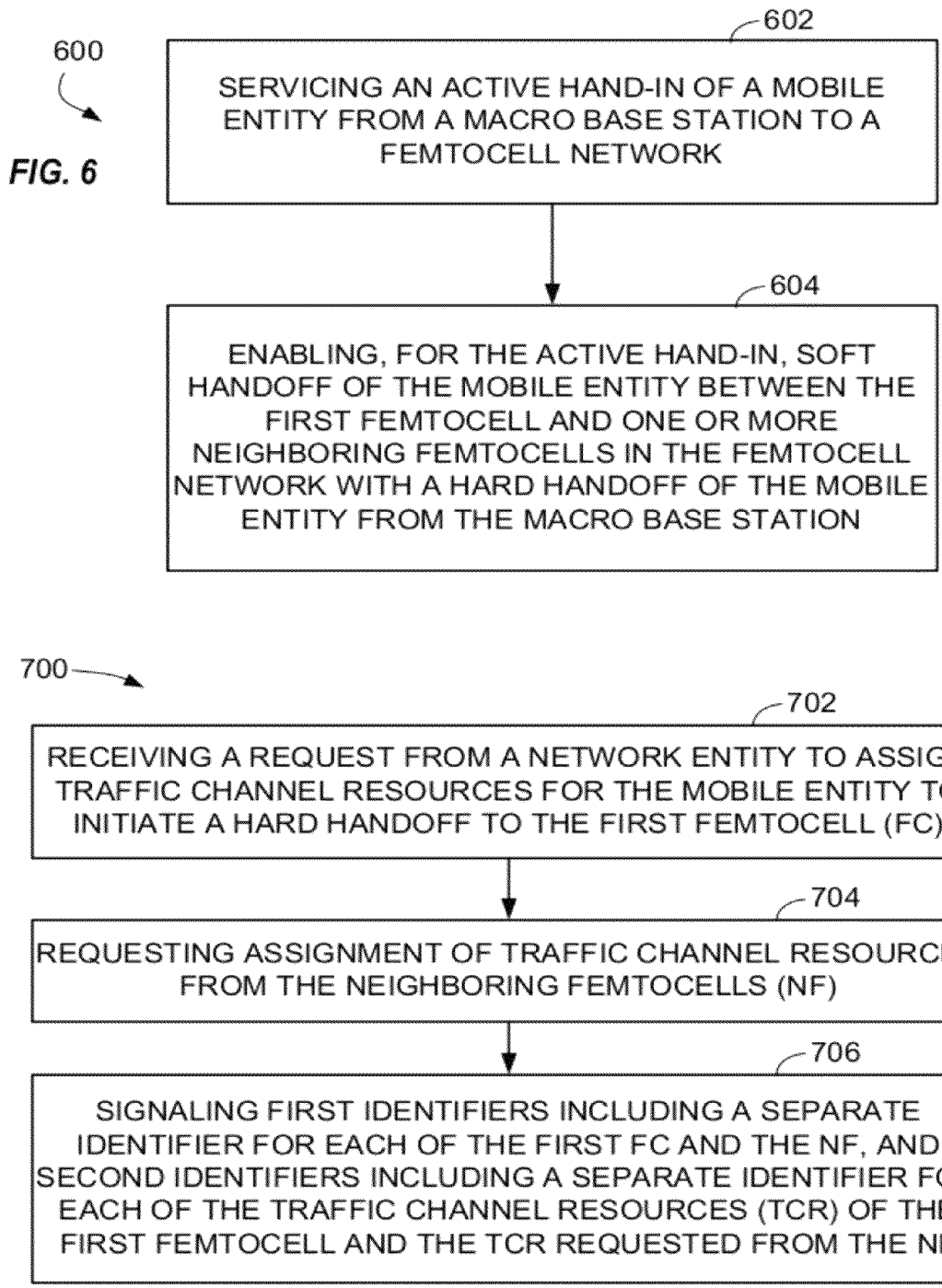

A method 600 for managing an active hand-in to a group of access points, using an access point capable of supporting soft handover with one or more additional access points, is shown in FIG. 6. The access point may be, or may include, a femtocell base station of any of the various forms described herein. The group of access points may be, or may include, femtocell base stations in a multi-femto deployment. For brevity, a femtocell base station may sometimes be referred to herein as a "femtocell" or a "femto base station." Similarly, a macrocell base station may sometimes be referred to as a "macrocell" or "macro base station."

In an aspect, the method 600 may be used to provide an active hand-in from a macrocell to a group of femtocells, wherein Soft Handoff (SHO) between femtocells is enabled together with hard handoff to the group of femtocells. Characteristically, handoff from a macrocell to one femtocell is a hard handoff, in that only one of the base stations—either the macrocell or femtocell—serves a mobile entity any point in time. Prior to a hard handoff the macro base station serves the mobile entity, while after hard hand handoff the femtocell serves the mobile entity. Voice call quality after the handoff may suffer if a sub-optimal femtocell is picked for hand-in or the forward link channel quality of the desired femtocell is inadequate. These problems can be solved by initiating hand-in to multiple femtocells that are within the same multi-femto network. These femtocells typically support soft handoff between themselves. As a result, by implementing novel operations as described herein prior to beginning the active hand-in, the hand-in may be initiated with multiple femtocells that can serve the user simultaneously immediately after hard handoff to the group of femtocells. Such hand-in with soft handoff between femtocells may provide diversity gain and improve hand-in success rate even if RL sensing is not capable of identifying the best target femtocell for hand-in. Thus, hand-in with SHO may overcome problems resulting from inaccuracies in RL sensing and target femtocell selection.

The method 600 for enabling an active hand-in from a macro base-station network to a femtocell network may include, at 602, servicing an active hand-in of a mobile entity from a macro base station to a femtocell network, using a first femtocell of the femtocell network. The first femtocell may be an initial target femtocell selected by a network entity of a wireless communications system including the macrocell network and the femtocell network. A multi-femto deployment may be understood as an example of the femtocell network. The servicing of the active hand-in may include conventional operations performed by a target femtocell to support active hand-in, and optionally novel operations as disclosed herein. Various examples of both conventional and novel operations for servicing an active hand-in to a multi-femto deployment are provided below. The method 600 may further include, at 604, enabling soft handoff of the mobile entity between the first femtocell and one or more neighboring femtocells in the femtocell network with a hard handoff of the mobile entity from the macro base station for the active hand-in. In an aspect of the method, the soft handoff may be enabled prior to, simultaneously with, or immediately upon completion of the hard handoff, such that soft handoff service is enabled for the mobile entity from the first data bit served after hand-in. To enable this result the multi-femto network receiving the hand-in should be capable of supporting soft handoff between femtocells.

Enabling the soft handoff with the hard handoff may be provided by performing certain novel operations during the servicing of the active hand-in. For example, the enabling may include causing traffic channel resources for hand-in of the mobile entity to be allocated at multiple femtocells of the femtocell network, prior to the active hand-in, as described in more detail below. The enabling may further include providing information identifying the traffic channel resources for the multiple femtocells to the mobile entity, prior to the hard handoff. Further or more detailed examples of novel operations for enabling the soft handoff together with the hard handoff are provided below.

A more detailed example of the method 600 as it may be implemented in connection with other operations for an active hand-in procedure, including conventional operations in such a procedure for use with the method 600, is provided below. The example of a specific procedure for performing hand-in with SHO enabled between femtocells may be described as including the steps enumerated immediately below. It should be appreciated that method 600 is not limited to use with the specific enumerated steps, which are provided by way of example, and not by way of limitation.

1) A mobile station (MS) may detect a femtocell (or beacon) pilot above a certain channel quality threshold, and report this pilot's PN offset code and pilot strength using a PSMM (or equivalent message) to a macro BS.

2) The macro BS may trigger (initiate) an active hand-in if the detected pilot strength of the femtocell as reported by the MS exceeds a defined handoff criteria. For example, active hand-in may be triggered if the femtocell pilot strength is greater than the macrocell pilot strength by a defined hysteresis margin. The macro BS may request a mobile switching center (MSC) or other network entity to perform hand-in with the identified target femtocell identified by the reported pilot PN offset.

3) The MSC or other network entity may forward the handoff request to a Femto Convergence Server (FCS) or other network entity. The handoff request may include other information such as a femtocell PN offset code, a mobile identifier (e.g. long code mask (LCM)), and other information.

4) The FSC or other network entity may request femtocells associated with the reported PN offset to perform RL sensing, i.e., measure RL pilot energy of this particular mobile based on its unique signature (e.g. long code mask). After receiving multiple RL sensing reports from these femtocells, the FSC may select the femtocell that reports the strongest RL pilot received strength. FCS may also include additional criteria or metrics in making this determination, for example, femtocell's FL transmission power, historical hand-in success rate to this femtocell, and other criteria.

5) After selecting an optimal target femtocell, the FCS may request this femtocell to assign traffic channel resources (e.g. Walsh code) for this mobile, to initiate active hand-in of the MS to the optimal target femtocell.

6) In response to receiving the traffic channel resource request, the target femtocell may request several of its neighboring femtocells to similarly assign traffic channel resources for hand-in of the MS. The neighboring femtocells may provide traffic channel resource assignment identifiers (e.g. Walsh codes) associated with their respective pilot PN offsets to the target femtocell. The target femtocell may select the neighboring femtocells using additional operations 800 as described in more detail in connection with FIG. 8 below.

7) The target femtocell may forward the traffic channel resource assignment identifiers (e.g. Walsh codes) and pilot PN offsets for itself and the neighboring femtocells to the FCS by standard or proprietary signaling messages. For example, the target femtocell may use a handoff request acknowledgement message as specified by CDMA2000 1xRTT. Instead of the target femtocell, some other network entity may also perform the functions in steps 6 and 7 with help of the target femtocell, or independently, as well.

8) The FCS may forward the information received from the target femtocell to the source macro base station via the MSC.

9) The source macro BS may transmit the received femtocell PN offsets and traffic channel assignment information to the MS, for example using a handoff direction message (HDM) or universal HDM (UHDM), along with the FL frequency where the target femtocells can be found. The target femtocells may include the first optimal target femtocell and all of its neighbor femtocells such as supplied traffic channel resource assignment identifiers in response to the request from the optimal target (first) femtocell.

10) Upon receiving the above information, the mobile entity may search for the femtocell PNs on the specified frequency and perform conventional operations to decode traffic channel data on the assigned traffic channels from the femtocells. Thus, the optimal target femtocell and its neighbors, in cooperation with other entities of a wireless network, may enable active hand-in of the MS into the femtocell network with soft handoff enabled between multiple target femtocells at the time of hand-in. The problems described above for active hand-in may thereby be mitigated, and active hand-in to a multi-femto deployment be more reliably and robustly accomplished.

FIGS. 7-10 show further optional operations or aspects 700, 800, 900 or 1000 that may be performed by the access point in conjunction with the method 600, or in some cases independently of said method. The operations shown in FIGS. 7-10 are not required to perform the method 600. The operations are independently performed and not mutually exclusive. Therefore any one of such operations may be performed regardless of whether another downstream or independent upstream operation is performed. If the method 600 includes at least one operation of FIGS. 7-10, then the method 600 may terminate after the at least one operation, without necessarily having to include any subsequent downstream operation(s) that may be illustrated. In addition, certain elements of the additional operations, such as the additional operations 900 or 1000, may be implemented independently of the method 600 as well as in conjunction with it.

Referring to FIG. 7, method 600 may include one or more of the additional operations 700. In an aspect, the method 600 may further include, at 702, the first femtocell receiving a request from a network entity to assign traffic channel resources for the mobile entity to initiate a hard handoff to the first femtocell. The first femtocell may generate the request in response to a request from a network entity to initiate an active hand-in procedure for a mobile entity. The method 600 may further include, at 704, the first femtocell requesting assignment of traffic channel resources from the one or more neighboring femtocells, in response to the request. For example, the first femtocell may transmit a signal to selected neighboring femtocells using a signaling protocol adapted from a protocol for initiating a soft handover.

The method 600 may further include, at 706, transmitting first identifiers including a separate identifier for each of the first femtocell and the one or more neighboring femtocells, and second identifiers including a separate identifier for each of the traffic channel resources of the first femtocell and the traffic channel resources requested from the one or more neighboring femtocells, in reply to the request. For example, the first femtocell may transmit the described identifiers to the network entity that request to initiate an active hand-in procedure. In an aspect, the method 600 may also include preparing the one or more neighboring femtocells for the active hand-in of the mobile entity, based on receiving the request. Such preparations may include allocating the identified traffic channel resources at the target femtocell and its neighbors prior to completing the hard handoff, enabling soft handover together with the hard handoff during active hand-in.

One important element of the above procedure may include selecting the neighbor femtocells that should be included in the soft handover operation during active hand-in. The neighbor femtocells may be selected by the target femtocell in one (or combination of one or more) of the following ways. Referring to FIG. 8, method 600 may include one or more of the additional operations 800 for identifying and selecting the neighbor femtocells. The method 600 may further include, at 802, identifying the one or more neighboring femtocells of the femtocell, using a selection procedure at the first femtocell based on signals from femtocells of the femtocell network. For example, the target femtocell may detect other neighboring femtocells using their Network Listen (NL) functionality and choose femtocells that have highest signal strengths as SHO neighbors. For further example, a target femtocell may request its active mobile stations to report pilot strengths, PN offsets, or similar parameters of other femtocells even when they are not about to perform active hand-out. In this way, each femtocell in the network may collect statistics about neighbor pilot strengths, PN offsets, or other data, and use this information when needed for determining the SHO neighbor set. Each femtocell may thereby maintain a list or table of SHO neighbors.

In the alternative, or in addition, the method may include, at 804, identifying the one or more neighboring femtocells of the first femtocell, using a defined set of neighbors provided by a separate entity. For example, when femtocells are deployed in an enterprise, a technician (e.g. operator technician or IT technician) may provide each femtocell with data identifying pilot PN offsets for femtocells that are neighbors for a particular femtocell. This femtocell may then request traffic channel resources from these configured neighbor femtocells. The technician may select the SHO neighbors simply based on deployment topology (e.g. physical proximity between femtocells) or by performing RF coverage tests to determine which femtocells share coverage boundaries and chose them as SHO neighbors.

Typically, active hand-in and active hand-out (handoff from a femtocell to macrocell) will happen along similar routes. For example, hand-in is likely to happen when users enter the building from some entrance and similarly hand-out will happen when users leave the building through this entrance. Therefore, prior to active hand-out of a mobile, a femtocell (say, femtocell 'A') may request the mobile to detect and report back other femtocell pilots PN offsets (e.g. through PSMMs). The reported femtocell PN offsets will also be detected by a mobile when entering the building and therefore these PN offsets are likely to identify optimal SHO neighbors for this particular femtocell 'A.' Thus, this femtocell 'A' may pick the reported neighbor femtocell PN offsets as identifying SHO neighbors during an active hand-in process. Similarly, each femtocell may collect long-term statistics over time, such as, for example, how many pilot PN offsets were reported prior to active hand-out, pilot strengths, the percentage of times a particular PN was reported, and identify prospective SHO neighbors based on this information. For example, femtocell may select the top two or three (in terms of their pilot strengths) neighbors for SHO operation. A femtocell that is detected more often than others may be preferred for inclusion in a SHO neighbor set over other femtocells. Thus, the SHO neighbor set for each femtocell may be refined or change over time as well.

FIG. 9 shows additional operations 900 that may be included in the method 600, or performed independently of method 600 as a separate method. The method 600 or a separate method may include, at 902, synchronizing a beacon hopping pattern among femtocells of the femtocell network using a common time reference, whereby the femtocells transmit frequency hopping beacons on common forward link frequencies at synchronized times.

Femtocells transmit frequency hopping beacons on macro forward link (FL) frequencies to attract idle as well as active mobile stations to femtocell frequency. Conventionally, different femtocells will be powered up at different times and their beacon transmissions may not be synchronized with one another. For example, at certain time 't', if a femtocell 'A' may be transmitting beacon on frequency 'F1', another femtocell 'B' may be transmitting beacon on another frequency 'F2.'

Such asynchronous beacon transmission may affect RL sensing performance, especially when the beacon and femtocell FL coverage ranges are not matched properly. For example, assume femtocell 'A' and 'B' have different beacon pilot PNs (PN_a and PN_b, respectively). At time 't', a mobile station on frequency 'F1' may detect femtocell 'A's beacon and send a PSMM (with PN_a) to its serving macro base station, even though the mobile station may be closer in terms of path loss to femtocell 'B.' Femtocell B's beacon may remain undetected as yet because at time 't', femtocell 'B' is transmitting beacon on frequency 'F2.' Conseqently, the FCS will only request RL sensing from femtocells with beacon PN equal to PN_a, and therefore the closest femtocell 'B' will not be selected as the optimal hand-in target.

Such problems may be avoided by synchronizing beacon transmission across femtocells belonging to the same multi-femto network, or potentially across all femtocells in the entire network. Beacon transmissions can be synchronized by providing identical beacon transmission schedule to these femtocells, for example, through operations, administration and management (OAM) signaling, along with a common time reference for synchronizing beacon transmissions. Conventionally, a different beacon transmission schedule for each femtocell is configured through OAM parameters. To synchronize beacon transmission across femtocells of a multi-femto network, all these femtocells may be configured with the same beacon schedule. The beacon schedule may specify a beacon hopping pattern relative to some common time reference (e.g. CDMA system time, paging channel slot index, paging channel slot cycle boundary, etc.). That is, the beacon schedule instructs each femtocell to hop on frequency X at time t1 relative to reference time, to hop on frequency Y at time t2 relative to reference time, and so forth. So long as all femtocells follow this common time reference and are configured with identical beacon schedule, synchronized beacon transmission can be achieved.

In a related aspect, the method 600 or a separate method may further include, at 904, selecting the first femtocell based on measurements of the frequency hopping beacons made by the mobile entity. Because the frequency hopping beacons are synchronized, the probability of selecting a sub-optimal target femtocell may be greatly reduced or eliminated. However, one possible drawback of this approach may include synchronized beacons interfering with one another at the mobile entity, resulting in incorrect or null pilot strength measurements.

FIG. 10 shows additional operations 1000 that may be included in the method 600, or performed independently as a separate method based on including all femtocell in a network in a reverse link sensing procedure. The method 600 or an independent method may include, at 1002, requesting all femtocells of the femtocell network to detect signal strength of a reverse link signal from the mobile entity. The method 600 or an independent method may include, at 1002, selecting the first femtocell as the optimal target, based on signal strength measurements provided by all the femtocells in the network.

In the example discussed above in connection with FIG. 9, femtocell 'B,' which was the closest to the mobile station at time 't', was not included in the RL sensing procedure because it's PN was not reported by the mobile in the PSMM and therefore femtocell 'B' could not be identified as a target femtocell for hand-in. One alternative for avoiding this may include performing sensing across all femtocells in the network. For example, as summarized above, the FCS may request all femtocells to perform RL sensing and then pick the target femtocell. Therefore, with reference to the continuing example, femtocell 'B' will also be caused to measure the mobile entity's RL strength, and femtocell 'B's measurement report will include the strongest RL pilot strength measurement due to its pathloss proximity to the mobile entity. The FCS may then select femtocell 'B' as the hand-in target, thereby resulting in successful hand-in. One drawback of the approach illustrated in FIG. 10, however, may be increased overhead from handling a greater number of RL measurements at each femtocell, and from managing the resulting increased number of reports received by the FCS or other entity.

Figure 11:
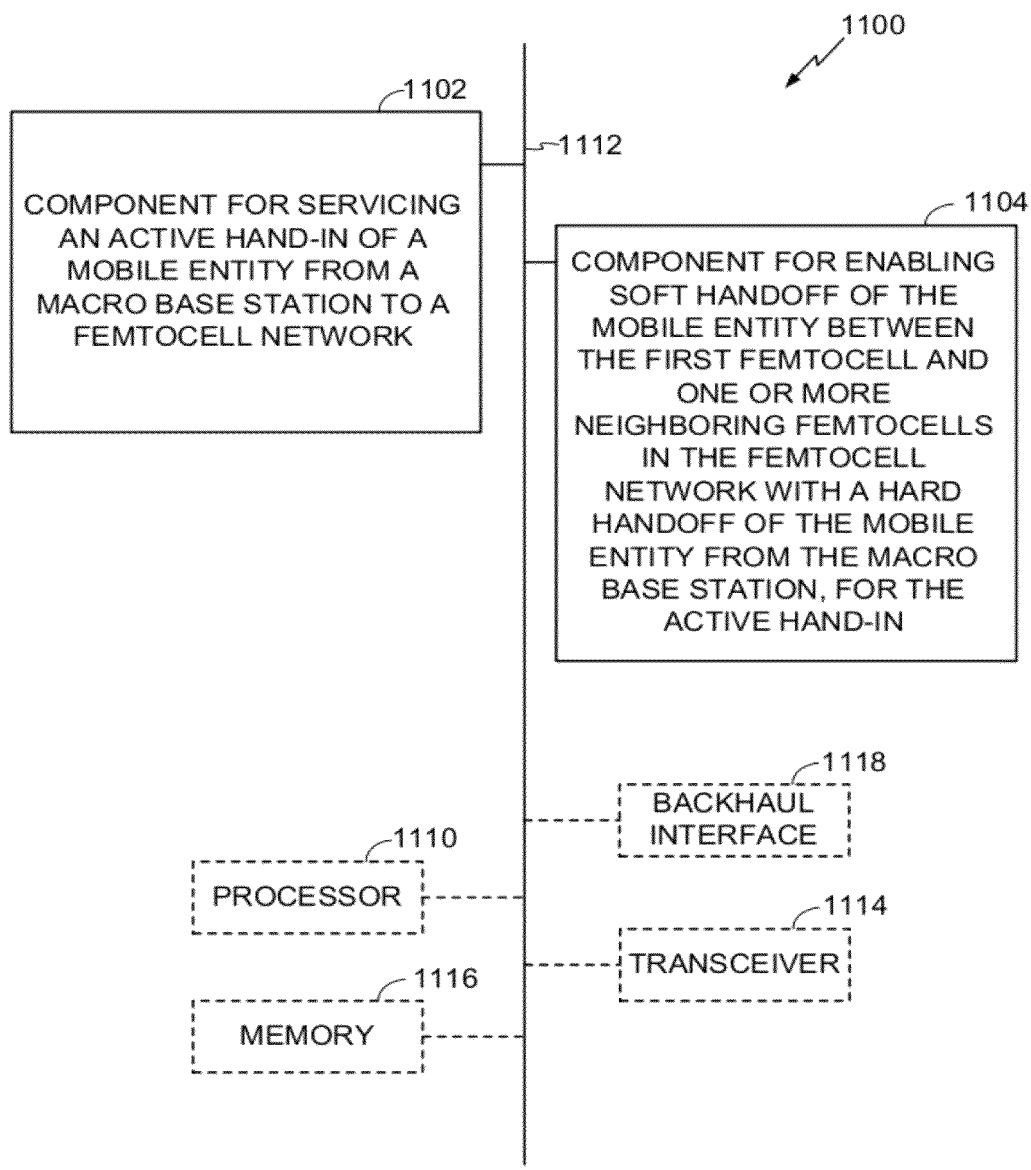
FIG. 11 is a block diagram illustrating an embodiment of an apparatus for active hand-in to a multi-femto deployment, in accordance with the methodologies of FIGS. 6-10.

With reference to FIG. 11, there is provided an exemplary apparatus 1100 that may be configured as an access point in a wireless network, or as a processor or similar device for use within the access point, for enabling active hand-in having soft handoff coupled to hard handoff. The apparatus 1100 may include functional blocks that can represent functions implemented by a processor, software, or combination thereof (e.g., firmware).

In one embodiment, the apparatus 1100 may include an electrical component or module 1102 for servicing an active hand-in of a mobile entity from a macro base station to a femtocell network including multiple femtocells. For example, the electrical component 1102 may include at least one control processor coupled to a transceiver or the like and to a memory with instructions for performing conventional and novel operations as described above for servicing active hand-in at a femtocell, alone or in cooperation with one or more other network entities. The electrical component 1102 may be, or may include, a means for servicing an active hand-in. Said means may be or may include the at least one control processor operating an algorithm. The algorithm may operate in an application layer to receive and appropriately respond to an active hand-in request from a macro base station, and for serving a mobile entity after hard handoff.

The apparatus 1100 may include an electrical component 1104 for enabling soft handoff of the mobile entity between the first femtocell and one or more neighboring femtocells in the femtocell network with a hard handoff of the mobile entity from the macro base station, for the active hand-in. For example, the electrical component 1104 may include at least one control processor coupled to a memory holding instructions for selecting SHO neighbor femtocells and instructing them to prepare for SHO by allocating resources, prior to the active hand-in. The electrical component 1104 may be, or may include, a means for enabling soft handoff of the mobile entity between the first femtocell and one or more neighboring femtocells in the femtocell network with a hard handoff of the mobile entity from the macro base station. Said means may be or may include the at least one control processor operating an algorithm. The algorithm may operate in an application and/or control layer to proactively cause allocation of traffic channel resources for the SHO. The algorithm may further operate to select neighbor femtocells, for example using measurements or stored data including predetermined identifiers for neighbor femtocells, or a combination of the foregoing selection methods. The algorithm may further operate to instruct the femtocell neighbors to allocate traffic channel resources for a mobile entity about to undergo active hand-in. The algorithm may further operate to transmit identifiers for the femtocell neighbors to a network entity for use in the active hand-in for the mobile entity with SHO enabled.

The apparatus 1100 may include similar electrical components for performing any or all of the additional operations 700, 800, 900, or 1000 described in connection with FIGS. 7-10, which for illustrative simplicity are not shown in FIG. 11.

In related aspects, the apparatus 1100 may optionally include a processor component 1110 having at least one processor, in the case of the apparatus 1100 configured as an access point. The processor 1110, in such case, may be in operative communication with the components 1102-1104 or similar components via a bus 1112 or similar communication coupling. The processor 1110 may effect initiation and scheduling of the processes or functions performed by electrical components 1102-1104. The processor 1110 may encompass the components 1102-1104, in whole or in part. In the alternative, the processor 1110 may be separate from the components 1102-1104, which may include one or more separate processors.

In further related aspects, the apparatus 1100 may include a radio transceiver component 1114. A stand alone receiver and/or stand alone transmitter may be used in lieu of or in conjunction with the transceiver 1114. In the alternative, or in addition, the apparatus 1100 may include multiple transceivers or transmitter/receiver pairs, which may be used to transmit and receive on different carriers. The apparatus 1100 may also include, or be coupled to, a backhaul interface 1118 for communicating with other femtocells in the network and with any network entity connected to via the backhaul. The apparatus 1100 may include a component for storing information, such as, for example, a memory device/component 1116. The computer readable medium or the memory component 1116 may be operatively coupled to the other components of the apparatus 1100 via the bus 1112 or the like. The memory component 1116 may be adapted to store computer readable instructions and data for performing the activity of the components 1102-1104, and subcomponents thereof, or the processor 1110, or the additional aspects 700, 800, 900, or 1000, or the methods disclosed herein. The memory component 1116 may retain instructions for executing functions associated with the components 1102-1104. While shown as being external to the memory 1116, it is to be understood that the components 1102-1104 can exist within the memory 1116.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any non-transient tangible medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the novel aspects described herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for enabling an active hand-in from a macro base station network to a femtocell network, comprising:
servicing the active hand-in of a mobile entity from a macro base station to the femtocell network using a first femtocell of the femtocell network; and enabling, for the active hand-in, soft handoff of the mobile entity between the first femtocell and one or more neighboring femtocells in the femtocell network prior to, simultaneous with, or immediately upon completion of a hard handoff of the mobile entity from the macro base station, wherein soft handoff service is enabled for the mobile entity from the first data bit served after hand-in.

2. The method of claim 1, further comprising receiving, at the first femtocell, a request from a network entity to assign traffic channel resources for the mobile entity to initiate the hard handoff.

3. The method of claim 2, further comprising requesting assignment of traffic channel resources from the one or more neighboring femtocells prior to the hard handoff in response to the request.

4. The method of claim 3, further comprising signaling first identifiers including a separate identifier for each of the first femtocell and the one or more neighboring femtocells, and second identifiers including a separate identifier for each of the traffic channel resources of the first femtocell and the traffic channel resources requested from the one or more neighboring femtocells, in reply to the request.

5. The method of claim 1, further comprising identifying the one or more neighboring femtocells of the first femtocell, using a selection procedure at the first femtocell based on signals from femtocells of the femtocell network.

6. The method of claim 1, further comprising identifying the one or more neighboring femtocells of the first femtocell, using a defined set of neighbors provided by a separate entity.

7. The method of claim 1, further comprising:
receiving a beacon transmission schedule and a common reference time, wherein the one or more neighboring femtocells in the femtocell network follow the common reference time and are configured with beacon transmission schedules identical to the received beacon transmission schedule; and
transmitting frequency hopping beacons on common forward link frequencies at synchronized times.

8. The method of claim 7, wherein the first femtocell is selected based on measurements of the frequency hopping beacons made by the mobile entity.

9. The method of claim 1, further comprising:
receiving from a network entity a request to measure signal strength of a reverse link signal from the mobile entity; and
reporting reverse link signal strength measurements to the network entity.

10. The method of claim 9, wherein the first femtocell is selected based on the reported reverse link signal strength measurements.

11. An apparatus for enabling an active hand-in from a macro base station network to a femtocell network, the apparatus comprising:
means for servicing the active hand-in of a mobile entity from a macro base station to the femtocell network using a first femtocell of the femtocell network; and
means for enabling, for the active hand-in, soft handoff of the mobile entity between the first femtocell and one or more neighboring femtocells in the femtocell network prior to, simultaneous with, or immediately upon completion of a hard handoff of the mobile entity from the macro base station, wherein soft handoff service is enabled for the mobile entity from the first data bit served after hand-in.

12. An apparatus for enabling an active hand-in from a macro base station network to a femtocell network, comprising:

at least one processor configured for servicing the active hand-in of a mobile entity from a macro base station to the femtocell network using a first femtocell of the femtocell network, and enabling, for the active hand-in, soft handoff of the mobile entity between the first femtocell and one or more neighboring femtocells in the femtocell network prior to, simultaneous with, or immediately upon completion of a hard handoff of the mobile entity from the macro base station, wherein soft handoff service is enabled for the mobile entity from the first data bit served after hand-in; and
a memory coupled to the at least one processor for storing data.

13. The apparatus of claim 12, wherein the at least one processor is further configured for receiving, at the first femtocell, a request from a network entity to assign traffic channel resources for the mobile entity to initiate the hard handoff.

14. The apparatus of claim 13, wherein the at least one processor is further configured for requesting assignment of traffic channel resources from the one or more neighboring femtocells prior to the hard handoff in response to the request.

15. The apparatus of claim 14, wherein the at least one processor is further configured for signaling first identifiers including a separate identifier for each of the first femtocell and the one or more neighboring femtocells, and second identifiers including a separate identifier for each of the traffic channel resources of the first femtocell and the traffic channel resources requested from the one or more neighboring femtocells, in reply to the request.

16. The apparatus of claim 12, wherein the at least one processor is further configured for identifying the one or more neighboring femtocells of the first femtocell, using a selection procedure at the first femtocell based on signals from femtocells of the femtocell network.

17. The apparatus of claim 12, wherein the at least one processor is further configured for identifying the one or more neighboring femtocells of the first femtocell, using a defined set of neighbors provided by a separate entity.

18. The apparatus of claim 12, wherein the at least one processor is further configured for:
receiving a beacon transmission schedule and a common reference time, wherein the one or more neighboring femtocells in the femtocell network follow the common reference time and are configured with beacon transmission schedules identical to the received beacon transmission schedule; and
transmitting frequency hopping beacons on common forward link frequencies at synchronized times.

19. The apparatus of claim 18, wherein the first femtocell is selected based on measurements of the frequency hopping beacons made by the mobile entity.

20. The apparatus of claim 12, wherein the at least one processor is further configured for:
receiving from a network entity a request to measure signal strength of a reverse link signal from the mobile entity: and
reporting reverse link signal strength measurements to the network entity.

21. The apparatus of claim 20, wherein the first femtocell is selected based on the reported reverse link signal strength measurements.

22. A non-transitory computer-readable medium comprising code for servicing a active hand-in of a mobile entity from a macro base station to a femtocell network using a first femtocell of the femtocell network, and enabling, for the active hand-in, soft handoff of the mobile entity between the first femtocell and one or more neighboring femtocells in the femtocell network prior to, simultaneous with, or immediately upon completion of a hard handoff of the mobile entity from the macro base station, wherein soft handoff service is enabled for the mobile entity from the first data bit served after hand-in.

23. The non-transitory computer-readable medium according to claim 22, further comprising code for receiving, at the first femtocell, a request from a network entity to assign traffic channel resources for the mobile entity to initiate the hard handoff.

24. The non-transitory computer-readable medium according to claim 23, further comprising code for requesting assignment of traffic channel resources from the one or more neighboring femtocells prior to the hard handoff in response to the request.

25. The non-transitory computer-readable medium according to claim 24, further comprising code for signaling first identifiers including a separate identifier for each of the first femtocell and the one or more neighboring femtocells, and second identifiers including a separate identifier for each of the traffic channel resources of the first femtocell and the traffic channel resources requested from the one or more neighboring femtocells, in reply to the request.

26. The non-transitory computer-readable medium according to claim 22, further comprising code for identifying the one or more neighboring femtocells of the first femtocell, using a selection procedure at the first femtocell based on signals from femtocells of the femtocell network.

27. The non-transitory computer-readable medium according to claim 22, further comprising code for identifying the one or more neighboring femtocells of the first femtocell, using a defined set of neighbors provided by a separate entity.

28. The non-transitory computer-readable medium according to claim 22, further comprising code for
  receiving a beacon transmission schedule and a common reference time, wherein the one or more neighboring femtocells in the femtocell network follow the common reference time and are configured with beacon transmission schedules identical to the received beacon transmission schedule; and
  transmitting frequency hopping beacons on common forward link frequencies at synchronized times.

29. The non-transitory computer-readable medium according to claim 28, wherein the first femtocell is selected based on measurements of the frequency hopping beacons made by the mobile entity.

30. The non-transitory computer-readable medium according to claim 22, further comprising code for:
  receiving from a network entity a request to measure signal strength of a reverse link signal from the mobile entity; and
  reporting reverse link signal strength measurements to the network entity.

31. The non-transitory computer-readable medium according to claim 30, wherein the first femtocell is selected based on the reported reverse link signal strength measurements.

* * * * *